United States Patent
Ninokura

[11] Patent Number: 5,886,099
[45] Date of Patent: Mar. 23, 1999

[54] THERMOPLASTIC POLYESTER RESIN COMPOSITION

[75] Inventor: Hideki Ninokura, Shizuoka, Japan

[73] Assignees: Polyplastics Co., Ltd.; Daicel Chemical Industries, Ltd., both of Japan

[21] Appl. No.: 868,977

[22] Filed: Jun. 4, 1997

[30] Foreign Application Priority Data

Jun. 7, 1996 [JP] Japan .................................. 8-145725

[51] Int. Cl.$^6$ ............................ C08L 67/02; C08L 53/02
[52] U.S. Cl. ......................................... 525/92 F; 525/314
[58] Field of Search ............................................ 525/92 F

[56] References Cited

U.S. PATENT DOCUMENTS

| | | | |
|---|---|---|---|
| 4,933,429 | 6/1990 | McCracken | 528/275 |
| 5,106,909 | 4/1992 | Sezume | 525/67 |
| 5,244,970 | 9/1993 | Kobayashi | 525/69 |

FOREIGN PATENT DOCUMENTS

| | | |
|---|---|---|
| 0 268 981 A2 | 6/1988 | European Pat. Off. . |
| 0 402 279 A1 | 12/1990 | European Pat. Off. . |
| 0 409 580 A2 | 1/1991 | European Pat. Off. . |
| 0 498 426 A1 | 8/1992 | European Pat. Off. . |
| 0 658 603 A2 | 6/1995 | European Pat. Off. . |
| 0 664 320 A1 | 7/1995 | European Pat. Off. . |
| 0 779 303 A1 | 6/1997 | European Pat. Off. . |
| 40-23798 | 10/1965 | Japan . |
| 42-8704 | 4/1967 | Japan . |
| 43-6636 | 3/1968 | Japan . |
| 43-17979 | 7/1968 | Japan . |
| 46-32415 | 9/1971 | Japan . |
| 56-28925 | 7/1981 | Japan . |
| 59-133203 | 7/1984 | Japan . |
| 209952 | 8/1990 | Japan . |
| 256417 | 9/1994 | Japan . |
| 109307 | 10/1994 | Japan . |
| 025984 | 1/1995 | Japan . |

*Primary Examiner*—David Buttner
*Attorney, Agent, or Firm*—Nixon & Vanderhye P.C.

[57] ABSTRACT

To provide a thermoplastic polyester resin composition having excellent impact resistance, weldability and fluidity.

100 parts by weight of a thermoplastic polyester resin (A) having an intrinsic viscosity of at least 0.55 dl/g and containing at least 30 milliequivalents/kg of carboxyl end groups is blended with 1 to 10 parts by weight of a modified block copolymer (B) comprising a polymer block mainly comprising a vinyl aromatic compound and another polymer block mainly comprising a nonhydrogenated and/or hydrogenated conjugated diene compound in the same molecule wherein the conjugated diene component is partially or wholly epoxidized.

8 Claims, No Drawings

THERMOPLASTIC POLYESTER RESIN COMPOSITION

FIELD OF THE INVENTION

The present invention relates to a thermoplastic polyester resin composition which is excellent in mechanical properties, particularly an impact resistance and a weld characteristic and has an excellent flow property.

DESCRIPTION OF THE RELATED ART

Thermoplastic polyester resins represented by polyethylene terephthalate and polybutylene terephthalate are widely used in the fields of car parts, electric and electronic equipment parts and other precision equipment parts because of easy processability and excellence in mechanical properties and other physical and chemical properties. In recent years, an increase in an impact resistance has been required particularly in the fields of car parts, light electrical appliances, business instruments, packing containers and miscellaneous goods. Accordingly, a method in which diene-containing polymers such as ABS and MBS are blended has been proposed as one means for satisfying these requirements.

However, compositions which are sufficiently satisfactory in terms of total balance such as an impact resistance, weld strength and elongation and a flow property have not yet been obtained by the method described above.

A matter obtained by simply blending, for example, a polyester resin with an ABS resin is inferior in compatibility and has a markedly low impact resistance.

Further, a blended matter of a polyester resin and an ABS resin can not be expected to be improved in an impact strength to a large extent without dispersing primary particles, and therefore in order to enhance the dispersibility in melting and kneading, a polyester resin having a high viscosity has to be used, which makes the flow processability inferior and considerably restricts the uses thereof.

SUMMARY OF THE INVENTION

Accordingly, an object of the present invention is to obtain a resin composition which is excellent in an impact resistance and weld strength and elongation without damaging the molding processability (flow property) of a polyester resin.

Intensive investigations made by the present investigators in order to achieve the object described above have resulted in finding that a resin composition which is excellent in an impact resistance, a flow property and a weld characteristic can be obtained by melting and kneading a thermoplastic polyester resin having the specific properties with a styrene base polymer comprising a diene compound epoxidized at a conjugated diene part, and thus coming to complete the present invention.

That is, the present invention relates to a thermoplastic polyester resin comprising:

(A) 100 parts by weight of a thermoplastic polyester resin having an intrinsic viscosity of at least 0.55 dl/g and containing a terminal carboxyl group of at least 30 milliequivalents/kg, and (B) 1 to 100 parts by weight of a modified block copolymer comprising a polymer block mainly comprising a vinyl aromatic compound and another polymer block mainly comprising a non-hydrogenated and/or hydrogenated conjugated diene compound in the same molecule wherein the conjugated diene component is partially or wholly epoxidized.

The invention provides a polyester composition comprising the above shown (A) and (B). (B) is an epoxy-modified block copolymer comprising, as two blocks, an aromatic vinyl monomer unit A and an epoxy-modified, conjugated diene monomer unit B. (B) may be non-hydrogenated. Alternatively B is either in part or all hydrogenated at the unsaturation.

DETAILED DESCRIPTION OF THE INVENTION

The constitutional components of the resin materials used in the present invention shall be explained below in order in detail.

First, the thermoplastic polyester resin (A) which is a base resin in the present invention is polyester obtained by polycondensation of a dicarboxylic acid compound with a dihydroxyl compound, polycondensation of an oxycarboxylic acid compound or polycondensation of these three component compounds and displays the effects of the present invention to both of homopolyester and copoyester.

Examples of the dicarboxylic acid compound constituting the thermoplastic polyester resin used in the present invention include publicly known dicarboxylic acids such as terephthalic acid, isophthalic acid, naphthalenedicarboxylic acid, diphenyldicarboxylic acid, diphenyl ether dicarboxylic acid, diphenylethanedicarboxylic acid, cyclohexanedicarboxylic acid, adipic acid, and sebacic acid, and alkyl-, alkoxy- or halogen-substituted compounds thereof. Further, these dicarboxylic acid compounds can be used in the form of a derivative capable of forming ester, for example, lower alcohol ester such as dimethyl ester. They can be used in combination of two or more kinds thereof.

Next, examples of the dihydroxy compound constituting the thermoplastic polyester resin used in the present invention include dihydroxy compounds such as ethylene glycol, propylene glycol, butanediol, neopentyl glycol, hydroquinone, resorcin, dihydroxyphenyl, naphthalenediol, dihydroxydiphenyl ether, cyclohexanediol, 2,2-bis(4-hydroxyphenyl) propane and diethoxidized bisphenol A and polyoxyalkylene glycol, and alkyl-, alkoxy- or halogen-substituted compounds thereof. They can be used alone or in a mixture of two or more kinds thereof.

Examples of the oxycarboxylic acid compound used in the present invention include oxydicarboxylic acids such as oxybenzoic acid, oxynaphthoic acid and diphenyleneoxycarboxylic acid, and alkyl-, alkoxy- or halogen-substituted compounds thereof. Further, the derivatives of these compounds capable of forming esters can be used as well. They can be used alone or in a mixture of two or more kinds thereof in the present invention.

In addition to the above compounds, it is possible to use polyesters which has a branched or cross-linked structure and in which trifunctional monomers, that is, trimellitic acid, trimesic acid, pyromellitic acid, pentaerythritol and trimethylolpropane are used in combination in small amounts.

Also included are polyester copolymers having halogens comprising compounds which have halogen compounds as substituents on aromatic nuclei, such as dibromoterephthalic acid, tetrabromoterephthalic acid, tetrachloroterephtalic acid, 1,4-dimethylol tetrabromobenzene, tetrabromobisphenol A, ethylene of tetrabromobisphenol A and propylene oxide adducts and contain ester-forming groups.

Further, a polyester base elastomer constituting a block copolymer of a high melting hard segment and a low melting hard segment can be used as well. This polyester base elastomer includes, for example, a block copolymer of a hard segment comprising mainly an alkylene terephthalate unit with a soft segment comprising aliphatic polyester or polyether.

In the present invention, all of thermoplastic polyesters prepared by polycondensation using such compounds as described above as monomer components can be used for the component (A) of the present invention. They can be used alone or in a mixture of two or more kinds thereof. Polyalkylene terephthalate is preferably used, and polybutylene terephthalate and a polymer mainly comprising it are more preferably used.

It is important that the thermoplastic polyester resin used in the present invention has an intrinsic viscosity falling in a range of 0.55 dl/g or more, preferably 0.55 to 1.2 dl/g and more preferably 0.55 to 0.90 dl/g, wherein the viscosity is measured at 30° C. using o-chlorophenol as a solvent. The intrinsic viscosity falling below 0.55 dl/g brings about a reduction in the physical properties. On the other hand, too high viscosity deteriorates the flow property in molding. It is essential in the present invention to use the thermoplastic polyester resin containing a carboxyl end group of 30 milliequivalents/kg or more, preferably 35 mnilliequivalents/kg or more and particularly preferably 40 milliequivalents/kg or more, wherein a pulverized sample of the polyester resin is dissolved in benzyl alcohol at 215° C. for 10 minutes, and then the solution is titrated with a 0.01N sodium hydroxide aqueous solution to determine the carboxyl end group. The carboxyl end group of less than 30 milliequivalents/kg reduces the weld strength and elongation of the material and therefore is not preferred.

Next, the vinyl aromatic compound constituting the block copolymer (B) which is used for the component (B) in the present invention is at lest one capable of being selected from among, for example, styrene, α-methylstyrene, vinyltoluene, p-tert-butylstyrene, divinylbenzene, p-methylstyrene and 1,1-diphenylstyrene. Among them, styrene is preferred. The conjugated diene compound is at least one selected from among, for example, butadiene, isoprene, 1,3-pentadiene, 2,3-dimethyl-1,3-butadiene, piperylene, 3-butyl-1,3-octadiene and phenyl-1,3-butadiene. Among them, butadiene, isoprene and combination thereof are preferred.

The block copolymer used in the present invention is a block copolymer comprising a polymer block A comprising mainly a vinyl aromatic compound and a polymer block B comprising mainly a conjugated diene compound, and the copolymerization ratio by weight of the vinyl aromatic compound to the conjugated diene compound is 5/95 to 70/30, particularly preferably 10/90 to 60/40.

The block copolymer used in the present invention has a number average molecular weight of 5,000 to 600,000, preferably 10,000 to 500,000 and a molecular weight distribution [ratio (Mw/Mn) of weight average molecular weight (Mw) to number average molecular weight (Mn)] of 10 or less. The molecular structure of the block copolymer may be linear, branched, radial or optional combination thereof.

The block copolymer includes, for example, a vinyl aromatic compound-conjugated diene compound block copolymer having a structure such as A-B-A, B-A-B-A, (A-B-)$_4$Si and A-B-A-B-A. Further, the unsaturated bond of the conjugated diene compound contained in the block copolymer may be partially hydrogenated.

A method for producing the block copolymer used in the present invention may be any one as long as the block copolymer having the structure described above can be obtained. The vinyl aromatic compound-conjugated diene compound block copolymer can be synthesized in an inert solvent using a lithium catalyst according to methods described in, for example, JP-B-40-23798, JP-B-43-17979, JP-B-46-32415 and JP-B-56-28925. Further, the partially hydrogenated block copolymer used in the present invention can be synthesized in an inert solvent by hydrogenating in the presence of a hydrogenation catalyst according to methods described in JP-B-42-8704, JP-B-43-6636 and JP-B-59-133203.

In the present invention, the block copolymer described above is epoxidized to obtain the epoxy-modified block copolymer used in the present invention.

The epoxy-modified block copolymer in the present invention can be obtained by reacting the block copolymer described above with an epoxidizing agent such as hydroperoxides and peracids in an inert solvent.

The peracids include performic acid, peracetic acid, perbenzoic acid and trifluoroperacetic acid. Among them, peracetic acid is the preferred epoxidizing agent because it is industrially produced in a large amount and available at a low price and has a high stability.

The hydroperoxides include hydrogen peroxide, tertiary butyl hydroperoxide and cumen peroxide.

A catalyst can be used in epoxidation, if necessary. In the case of, for example, peracid, alkali such as sodium carbonate and acid such as sulfuric acid can be used as the catalyst. In the case of hydroperoxides, a catalyst effect can be obtained by using a mixture of tungstic acid and sodium hydroxide in combination with hydrogen peroxide, organic acid in combination with hydrogen peroxide or molybdenum hexacarbonyl in combination with tertiary butyl hydroperoxide.

The amount of the epoxidizing agent is not strictly restricted, and the optimum amounts in the respective cases are determined depending on variable factors such as the individual epoxidizing agent used, the desired epoxidation degree and the individual block copolymer used.

The inert solvent can be used for the purposes of reducing the viscosity of the raw materials and stabilizing the epoxidizing agent by dilution. In the case of peracid, aromatic compounds, ethers and esters can be used. The particularly preferred solvent includes hexane, cyclohexane, toluene, benzene, ethyl acetate, carbon tetrachloride and chloroform. The epoxidation conditions are not strictly restricted. The usable reaction temperature range is determined depending on the reactivity of the epoxidizing agent used. In the case of, for example, peracetic acid, a temperature range of 0 to 70° C. is preferred. The temperature range of lower than 0° C. retards the reaction, and the temperature range exceeding 70° C. causes the decomposition of peracetic acid. In the case of a tertiary butyl hydroperoxide/molybdenum dioxide diacetyl acetonate system which is one example of hydroperoxide, a temperature range of 20° to 150° C. is preferred because of the same reason. The reaction mixture does not have to be specifically handled and can be stirred for 2 to 10 hours. The resulting epoxy-modified copolymer can be separated by suitable methods, for example, a method for precipitating the copolymer by poor solvents, a method in which the copolymer is poured into hot water while stirring to remove the solvent by distillation and a method for removing directly the solvent.

The epoxy-modified block copolymer described above has an epoxy equivalent of preferably 200 to 5,000 g/mol, particularly preferably 300 to 4,000 g/mol. The epoxy equivalent exceeding 5,000 g/mol does not improve the compatibility and causes phase separation. On the other hand, the epoxy equivalent of less than 200 g/mol does not provide an effect beyond the expected ones (compatibility and the like) and is liable to cause side reactions such as the formation of gel during the separation of the copolymer. Accordingly, such amount is not preferred.

The effective addition amount thereof is 1 to 100 parts by weight, preferably 3 to 80 parts by weight per 100 parts by weight of the polyester resin (A). If this addition amount is too small, the high and low temperature impact character can not be expected to be enhanced. In contrast with this, too much amount lowers the flow property of the material and reduces the moldability. Accordingly, such amount is not preferred.

Other thermoplastic resins can supplementarily be used in small amounts in combination with the resin composition of the present invention as long as the effects of the present invention are not inhibited.

There can be blended in an optional proportion according to purposes, for example, polyamide, polyacetal, polystyrene, styrene-butadiene copolymers, By styrene-butadiene-acrylonitrile copolymers, styrene-butadiene-acrylic acid (or ester thereof) copolymers, polycarbonate, polyurethane, polyphenylene oxide, polyphenylene sulfide, polybutadiene, halogenated polyolefin, polyhalogenated vinyl, butyl rubber, and copolymers containing principally polyacrylate (including multilayer graft copolymers).

It is a matter of course that there can be blended as well, publicly known substances which are usually added to thermoplastic resins and thermosetting resins, that is, stabilizers such as an antioxidant, a heat resistant stabilizer and a UV absorber, anti-static agents, colorants such as a dye and a pigment, lubricants, plasticizers, crystallization accelerators, and crystallization nucleus agents.

Further, the composition of the present invention is preferably blended with inorganic or organic fibrous reinforcing materials and inorganic fillers in many cases according to the purposes.

The fibrous reinforcing materials include inorganic fibers such as glass fiber, carbon fiber, ceramic fiber, boron fiber, potassium titanate fiber and asbestos, and organic fibers such as aramide fiber. The inorganic fillers include powder and granular materials and tabular inorganic compounds such as calcium carbonate, high dispersible silicate, alumina, aluminum hydroxide, talc, clay, mica, glass flake, glass powder, glass beads, quartz powder, silica sand, wollastonite, carbon black, barium sulfate, calcined gypsum, silicon carbide, boron nitrite and silicon nitrite.

These inorganic fillers can be used alone or in combination of two or more kinds thereof, if necessary.

The composition of the present invention can readily be prepared by publicly known facilities and methods usually used as a conventional method for preparing a resin composition. There can be used any of, for example, i) a method in which respective components are mixed and then kneaded and extruded by means of an extruder to prepare pellets, followed by molding, ii) a method in which pellets having different compositions are once prepared, and the pellets are blended in prescribed amounts and molded to obtain a molded article, and iii) a method in which at least one of respective components is charged directly into a molding machine. Further, a method in which a part of resin components is pulverized into fine powder and is mixed with other components than it is preferred for blending homogeneously these components.

The fillers and the like described above can be added at optional periods before or during reaction to obtain the desired composition as long as the reaction of the polyester resin with the epoxy compound is not inhibited.

EXAMPLES

The present invention will now be described below in more detail with reference to examples but the present invention is not intended to be limited thereto.

The physical property values shown in the following examples were determined by the following methods:
(1) Melt viscosity The value was measured at 250° C. and a shear rate of 1216 sec.$^{-1}$ by means of a capillary flow tester.
(2) Tensile strength and elongation A tensile test piece was molded with a test piece die prescribed in ASTM, and the tensile strength and the tensile elongation were measured according to ASTM D-256.
(3) Weld part tensile strength and elongation A test piece was molded with a die capable of providing the test piece with a weld line at the center thereof as prescribed in ASTM, and the tensile strength and the tensile elongation were measured according to ASTM D-638.
(4) Izod impact strength The Izod impact strength of a test piece provided with a notch was determined according to ASTM D-256.

Referential Example 1

A reactor equipped with a stirrer and a fractionating column was charged with 2,232 g of dimethyl terephthalate, 1,153 g of butanediol and 10.0 g of tetrabutyl titanate. Transesterification and esterification were carried out while elevating the temperature from 160° C. to 220° C. in 90 minutes, wherein distilled methanol and water accounted for about 90% of the theoretical amounts. Then, the distillation path was switched from the fractionating column over to a direct cooling column connected to a vacuum pump, and the pressure was gradually reduced to 0.5 torr in about 30 minutes while elevating the temperature from 220° C. to 260° C. The polymerization was carried out at 260° C. and 0.5 torr for one and half hour, and then the polymer was taken out to pelletize. Subsequently, solid phase polymerization was carried out at 210° C. for 30 hours under nitrogen flow. The resulting polybutylene terephthalate (PBT) polymer (a-1) had an intrinsic viscosity (IV) of 0.85 dl/g and a carboxyl end group (CEG) of 51 milliequivalents/kg.

Further, various PBT polymers shown in Table 1 were obtained according to the production method of (a-1).

TABLE 1

| | Charaateristias |
|---|---|
| a-1 | IV; 0.85 dl/g CEG; 51 milliequivalent/kg |
| a-2 | IV; 0.61 dl/g CEG; 72 milliequivalent/kg |
| a-3 | IV; 1.00 dl/g CEG; 40 milliequivalent/kg |
| a'-1 | IV; 0.85 dl/g CEG; 26 milliequivalent/kg |
| a'-2 | IV; 0.50 dl/g CEG; 81 milliequivalent/kg |

Referential Example 2

A jacketed reactor equipped with a stirrer, a reflux condenser and a thermometer was charged with 300 g of polystyrene-polybutadiene-polystyrene block copolymer (trade name: TR 2000, manufactured by Japan Synthetic Rubber Co., Ltd.) and 1,500 g of ethyl acetate to dissolve them. Then, 169 g of 30 weight % ethyl acetate solution of peracetic acid was continuously dropwise added to carry out epoxidation at 40° C. for 3 hours while stirring. The reaction liquid was cooled down to room temperatures and then taken out of the reactor. A large amount of methanol was added to precipitate the polymer, and after filtering, the polymer was washed and dried to obtain an epoxy-modified polymer. The resulting epoxy-modified polymer is an epoxy-modified block copolymer b-1 (epoxy equivalent: 520).

Referential Example 3

A jacketed reactor equipped with a stirrer, a reflux condenser and a thermometer was charged with 300 g of the block copolymer of polystyrene-polybutadiene-polystyrene (trade name: TR 2000, manufactured by Japan Synthetic Rubber Co., Ltd.) and 1,500 g of ethyl acetate to dissolve them. Then, 88 g of 30 weight % ethyl acetate solution of peracetic acid was continuously dropwise added to carry out epoxidation at 40° C. for 3 hours while stirring. The reaction liquid was cooled down to room temperatures and then taken out of the reactor. A large amount of methanol was added to precipitate the polymer, and after filtering, the polymer was washed and dried to obtain an epoxy-modified polymer. The resulting epoxy-modified polymer is an epoxy-modified block copolymer b-2 (epoxy equivalent: 1067).

Example 1

Hundred parts by weight of polybutylene terephthalate (a-1) having an intrinsic viscosity of 0.85 dl/g and a carboxyl end group of 51 milliequivalent/kg were mixed with 5 parts by weight of the epoxy-modified block copolymer (b-1), and the mixture was kneaded and extruded at 260° C. by means of a 30 mm φ extruder to prepare pellets. Then, the pellets were further injection-molded to obtain a test piece. The characteristic evaluation results thereof are shown in Table 2.

Examples 2 to 7

The same procedure as in Example 1 was repeated, except that the composition was changed, whereby the resin compositions of the present invention were obtained. The characteristic evaluation results thereof are shown in Table 2.

Comparative Examples 1 to 6

The same procedure as in Example 1 was repeated, except that the composition was changed, whereby the resin compositions for comparison were obtained. The characteristic evaluation results thereof are shown in Table 3.

The block copolymer (non-modified) shown in Tables 2 and 3 is the block copolymer of polystyrene-polybutadiene-polystyrene which is not epoxy-modified, and the diene-containing acryl polymer is MBS (brand name: Paraloid EXL2602 manufactured by Kureha Chemical Ind. Co., Ltd.).

TABLE 2

| | | Example | | | | | | |
|---|---|---|---|---|---|---|---|---|
| | Unit | 1 | 2 | 3 | 4 | 5 | 6 | 7 |
| Composition | | | | | | | | |
| PBT | (kind) | a-1 | a-1 | a-1 | a-1 | a-2 | a-2 | a-3 |
| | weight parts | 100 | 100 | 100 | 100 | 100 | 100 | 100 |
| Epoxy-modified block copolymer | (kind) | b-1 | b-1 | b-1 | b-2 | b-1 | b-1 | b-1 |
| | weight parts | 5 | 10 | 30 | 20 | 30 | 50 | 10 |
| Block copolymer (non-modified) | weight parts | — | — | — | — | — | — | — |
| Diene-containing acryl base polymer | weight parts | — | — | — | — | — | — | — |
| Physical property | | | | | | | | |
| Melt viscosity | Pa · s | 152 | 162 | 299 | 305 | 142 | 168 | 335 |
| Tensile strength | Mpa | 46.7 | 42.3 | 31.8 | 31.5 | 31.5 | 26.7 | 42.0 |
| Tensile elongation | % | >200 | >200 | >200 | >200 | >200 | >200 | >200 |
| Weld part tensile strength | Mpa | 40.3 | 38.1 | 27.4 | 26.7 | 24.4 | 21.9 | 38.6 |
| Weld part tensile elongation | % | 23 | 28 | 32 | 30 | 29 | 31 | 35 |
| Izod impact strength | J/m | 101 | 129 | 975 | 953 | 827 | N.B. | 276 |

Note: N.B. in the Izod impact strength shows "not broken".

TABLE 3

| | | Comparative Example | | | | | |
|---|---|---|---|---|---|---|---|
| | Unit | 1 | 2 | 3 | 4 | 5 | 6 |
| Composition | | | | | | | |
| PBT | (kind) | a-1 | a-1 | a-1 | a'-1 | a'-2 | a-2 |
| | weight parts | 100 | 100 | 100 | 100 | 100 | 100 |

TABLE 3-continued

| | | Comparative Example | | | | | |
|---|---|---|---|---|---|---|---|
| | Unit | 1 | 2 | 3 | 4 | 5 | 6 |
| Epoxy-modified block copolymer | (kind) weight parts | — | — | — | b-1 30 | b-1 10 | — |
| Block copolymer (non-modified) | weight parts | — | 30 | — | — | — | — |
| Diene-containing acryl base polymer | weight parts | — | — | 30 | — | — | — |
| Physical property | | | | | | | |
| Melt viscosity | Pa · s | 168 | 187 | 223 | 285 | 65 | 70 |
| Tensile strength | Mpa | 52.0 | 34.8 | 30.5 | 31.3 | 34.5 | 52.9 |
| Tensile elongation | % | 80 | 76 | 113 | >200 | 12 | 15 |
| Weld part tensile strength | Mpa | 49.4 | 11.3 | 28.5 | 28.1 | 20.2 | 49.2 |
| Weld part tensile elongation | % | 19 | 2 | 21 | 6 | 6 | 10 |
| Izod impact strength | J/m | 33 | 47 | 203 | 868 | 41 | 16 |

As apparent from the examples, when mixing a thermoplastic polyester resin with a styrene base polymer containing a diene compound epoxidized at a conjugated diene part, the thermoplastic resin compositions which are excellent in mechanical properties, particularly an impact resistance and a weld characteristic and a flow property can be obtained by melting and kneading the thermoplastic polyester resin in which an intrinsic viscosity and a terminal carboxyl group are controlled and the styrene base polymer containing a diene compound epoxidized at a conjugated diene part. Accordingly, the resulting thermoplastic resin compositions are very useful in such wide fields as car parts, electric and electronic appliance parts and the like, and are of a large industrial significance.

I claim:

1. A thermoplastic polyester resin composition comprising:
   (A) 100 parts by weight of a thermoplastic polyester resin having an intrinsic viscosity of at least 0.55 dl/g and containing at least 30 milliequivalents/kg of carboxyl end groups, and
   (B) 1 to 100 parts by weight of a modified block copolymer comprising a polymer block mainly comprising a vinyl aromatic compound and another polymer block mainly comprising a nonhydrogenated and/or hydrogenated conjugated diene compound in the same molecule, wherein the conjugated diene component is partially or wholly epoxidized.

2. The thermoplastic polyester resin composition as claimed in claim 1, wherein the thermoplastic polyester resin (A) is a polybutylene terephthalate resin.

3. The thermoplastic polyester resin composition as claimed in claim 1, wherein the epoxy-modified block copolymer has an epoxy equivalent of 200 to 5,000 g/mol.

4. The composition as claimed in claim 1, in which the copolymer (B) comprises the aromatic vinyl monomer unit and the conjugated diene monomer unit at a polymerization ratio of 5/95 to 70/30, and has a number-average molecular weight of 5,000 to 600,000 and a molecular weight distribution of 10 or less.

5. A thermoplastic polyester resin composition consisting essentially of:
   (A) 100 parts by weight of a thermoplastic polyester resin having an intrinsic viscosity of at least 0.55 dl/g and containing at least 30 milliequivalents/kg of carboxyl end groups, and
   (B) 1 to 100 parts by weight of a modified block copolymer comprising a polymer block mainly comprising a vinyl aromatic compound and another polymer block mainly comprising a nonhydrogenated and/or hydrogenated conjugated diene compound in the same molecule, wherein the conjugated diene compound is partially or wholly epoxidized.

6. The thermoplastic polyester resin composition as in claim 5, wherein the thermoplastic polyester resin (A) is a polybutylene terephthalate resin.

7. The thermoplastic polyester resin composition as in claim 5, wherein the epoxy-modified block copolymer has an epoxy equivalent of 200 to 5,000 g/mol.

8. The thermoplastic composition as in claim 5, wherein the modified block copolymer is comprised of the aromatic vinyl monomer unit and the conjugated diene monomer unit at a polymerization ratio of 5/95 to 70/30, and has a number-average molecular weight of 5,000 to 600,000 and a molecular weight distribution of 10 or less.

* * * * *